United States Patent
Tressler et al.

(10) Patent No.: US 9,892,533 B1
(45) Date of Patent: Feb. 13, 2018

(54) GRAPH VISUALIZATION SYSTEM BASED ON GRAVITATIONAL FORCES DUE TO PATH DISTANCE AND BETWEENNESS CENTRALITY

(71) Applicant: HRL Laboratories, LLC, Malibu, CA (US)

(72) Inventors: Eric P. Tressler, Washington, DC (US); David A. Jurgens, Palo Alto, CA (US)

(73) Assignee: HRL Laboratories, LLC, Malibu, CA (US)

( * ) Notice: Subject to any disclaimer, the term of this patent is extended or adjusted under 35 U.S.C. 154(b) by 22 days.

(21) Appl. No.: 14/972,067

(22) Filed: Dec. 16, 2015

Related U.S. Application Data

(60) Provisional application No. 62/236,003, filed on Oct. 1, 2015.

(51) Int. Cl.
*G06T 11/20* (2006.01)

(52) U.S. Cl.
CPC .................... *G06T 11/206* (2013.01)

(58) Field of Classification Search
CPC ....................................... G06T 15/20
See application file for complete search history.

(56) References Cited

U.S. PATENT DOCUMENTS

| | | | | |
|---|---|---|---|---|
| 8,989,046 B1 * | 3/2015 | Train | | H04L 45/02 370/252 |
| 2006/0106847 A1 * | 5/2006 | Eckardt III | ....... | G06F 17/30696 |
| 2012/0137367 A1 * | 5/2012 | Dupont | ................... | G06F 21/00 726/25 |
| 2012/0278261 A1 * | 11/2012 | Lin | ......................... | G06N 5/003 706/12 |
| 2012/0283958 A1 * | 11/2012 | Aurora | ..................... | G06F 19/22 702/20 |
| 2014/0075002 A1 * | 3/2014 | Pradhan | ............. | G06Q 30/0255 709/223 |
| 2014/0096249 A1 * | 4/2014 | Dupont | ................... | G06F 21/00 726/23 |
| 2014/0189665 A1 * | 7/2014 | Hong | ..................... | G06F 8/443 717/151 |
| 2017/0083492 A1 * | 3/2017 | Chang | ................. | G06F 17/2705 |

OTHER PUBLICATIONS

J. Barnes and P. Hut, "A hierarchical O(N log N) force-calculation algorithm," Nature 324 (4): pp. 446-449, 1986.
Brandes, Ulrik, "A taster algorithm for betweenness centrality," Journal of Mathematical Sociology 25: pp. 163-177, 2001.

(Continued)

*Primary Examiner* — Thomas Lett
(74) *Attorney, Agent, or Firm* — Tope-McKay & Associates

(57) ABSTRACT

The present invention relates to a system for graph visualization. The system includes a display and one or more processors with a memory. The processors perform several operations, including receiving as an input a graph G=(V,E), where V is a set of vertices and E is a set of edges between the vertices. The vertices are then randomly distributed through a unit square. The vertices are then arranged to generate an aesthetically pleasing graph, which is displayed on the display.

24 Claims, 8 Drawing Sheets

(56) References Cited

OTHER PUBLICATIONS

R. Davison and D. Harel, "Drawing Graphs Nicely Using Simulated Annealing," ACM Transactions on Graphics, 15(4), pp. 301-331, 1996.
Peter Eades. A heuristic for graph drawing. Congressus Numerantium, 42: pp. 149-160, 1984.
Fruchterman, T. M. J., & Reingold, E. M., "Graph Drawing by Force-Directed Placement," Software: Practice and Experience, 21(11), pp. 1129-1164, 1991.
Bastian M., Heymann S., Jacomy M., "Gephi: an open source software for exploring and manipulating networks," International AAAI Conference on Weblogs and Social Media, 2009.
Johnson, Donald B., "Efficient algorithms for shortest paths in sparse networks", Journal of the ACM 24 (1): pp. 1-13, 1977.
C. Walshaw, "A Multilevel Algorithm for Force-Directed Graph Drawing," Journal of Graph Algorithms and Applications, 7(3), pp. 253-285, 2003.
Y. F. Hu, "Efficient and high quality force-directed graph drawing," The Mathematica Journal, 10 (pp. 37-71), 2005.
Weisstein. Eric W. "Sierpiński Sieve Graph," From MathWorld—A Wolfram Web Resource, at http :// mathworld.wolfram.com/ SierpinskiSieveGraph.html downloaded on Dec. 22, 2015.

\* cited by examiner

Distance      (shortest path)
d(a,e) = 2      (a->d->e)
d(a,f) = 3      (a->b->c->f)

Bet. Cent.      (shortest paths containing $v$)
g(d) = 1      (a-e)
g(b) = 2      (a-c, a-f)
g(c) = 3      (a-f, b-f, b-e)
g(a)=g(e)=g(f)=0

GRAPH VISUALIZATION SYSTEM BASED ON GRAVITATIONAL FORCES DUE TO PATH DISTANCE AND BETWEENNESS CENTRALITY

CROSS-REFERENCE TO RELATED APPLICATIONS

This is a non-provisional application of U.S. Provisional Application No. 62/236,003, filed on Oct. 1, 2015, the entirety of which is incorporated herein.

BACKGROUND OF THE INVENTION (1) Field of Invention

The present invention relates to a graph visualization system and, more particularly, to a system for generating a graph visualization based on gravitational forces due to path distance and betweenness centrality.

(2) Description of Related Art

Graph visualization is a common problem, for instance in vehicular networks, computer networks, and relational data (such as disease transmission, social networks, and graphs of citations between authors). Given such a network, understanding it is partly accomplished through visualization techniques. However, graph visualization can be a difficult problem in which a graph (or network) is the input to the algorithm, and the output is a "reasonable" realization of that graph in two dimensions. Several force-directed approaches have attempted to resolve the graph visualization problem.

For example, the work of Peter Eades in "A heuristic for graph drawing," *Congressus Numerantium*, 42:149-160 (1984), was the first force-directed algorithm for graph drawing described in the literature. The work of Eades places springs (attractive force) between adjacent vertices, and a general repulsive force between all nonadjacent vertices. His algorithm does not place explicit attractive forces between vertices that are a graph distance of two or more apart, nor does he consider centrality as a metric.

Other researchers, Fruchterman, T. M. J., and Reingold, E. M., in "Graph Drawing by Force-Directed Placement." *Software: Practice and Experience*, 21(11), (1991), describe a widely-adopted force-directed algorithm. The process described by Fruchterman et al. uses a spring-based model, treating edges within the graph as springs and applying Hooke's law, and treating vertices as electrons and applying Coulomb's law. These competing attractive and repelling forces are iterated, until the graph reaches a minimal energy, which is hopefully aesthetically pleasing.

In yet other work, Y. F. Hu describes, in "Efficient and high quality force-directed graph drawing," *The Mathematica Journal*, 10 (37-71), (2005), a widely-used force-directed algorithm that relies upon a standard spring model with electrical charge-based repulsion. However, as was the case above, the work of Hu does not place explicit attractive forces between vertices that are a graph distance of two or more apart, nor does it consider centrality as a metric. Further, the model is dependent on a spring model.

Thus, a continuing need exists for system for generating a graph visualization that replaces the springs and electrons with gravitating particles, as well as introducing the notion of betweenness centrality to further guide the graph's evolution in time.

SUMMARY OF INVENTION

The present invention is directed to a system, method, and computer program product for graph visualization. In various embodiments, the system includes one or more processors and a memory. The memory has executable instructions encoded on a non-transitory computer readable medium, such that upon execution of the instructions, the one or more processors perform several operations, such as receiving as an input a graph G=(V,E), where V is a set of vertices and E is a set of edges between the vertices; distributing vertices through a unit square; arranging the vertices to generate a graph layout, where arrangement of the vertices reflects a betweenness centrality; and displaying the graph layout on a display.

In another aspect, arranging the vertices further comprises an operation of iteratively positioning two vertices v and v' at distance $GB(v,v'):=d(v,v')+g(v)+g(v')$ from each other, where $d(v,v')$ is a path distance between vertices v and v', and $g(v)$ is the betweenness centrality of v.

Additionally, in distributing vertices through a unit square, the vertices are randomly distributed.

In yet another aspect, each vertice represents a person and each edge represents a common interest between said person and another person.

In yet another aspect, each vertice represents a user on a social network and each edge represents a relationship between the users.

In yet another aspect, the vertices are arranged using betweenness centrality in a force directed graph based on gravitational forces.

In another aspect, arranging the vertices further comprises an operation of iteratively positioning two vertices v and v' at distance $GB(v,v'):=d(v,v')+g(v)+g(v')$ from each other, where a mass of a vertex v is $g(v)$ and a distance between v and v' is a Euclidean distance r between them, minus $GB(v,v')$, such that gravitational force between the two vertices is defined as:

$$F(v, v') = \lambda \frac{g(v)g(v')}{(r - GB(v, v'))^2}.$$

where $\lambda$ is a gravitational constant.

Finally, and as noted above, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
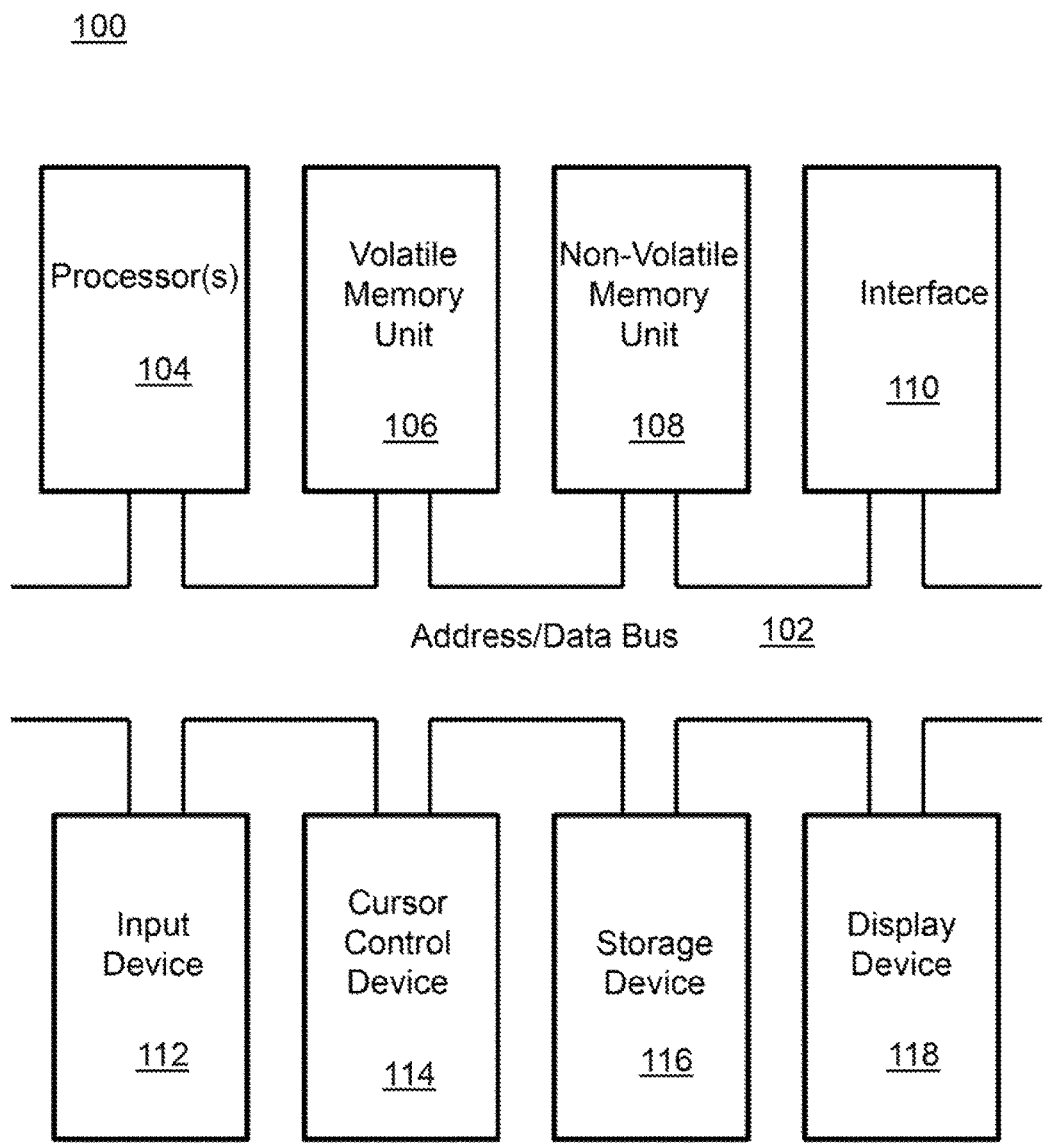
FIG. 1 is a block diagram depicting the components of a graph visualization system according to various embodiments of the present invention.

The present invention relates to a graph visualization system and, more particularly, to a system for generating a graph visualization based on gravitational forces due to path distance and betweenness centrality. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a description of various principal aspects of the present invention is provided. Subsequently, an introduction provides the reader with a general understanding of the present invention. Finally, specific details of the present invention are provided to give an understanding of the specific aspects.

(1) Principal Aspects

The present invention has three "principal" aspects. The first is a graph visualization system. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, or a field programmable gate array.

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
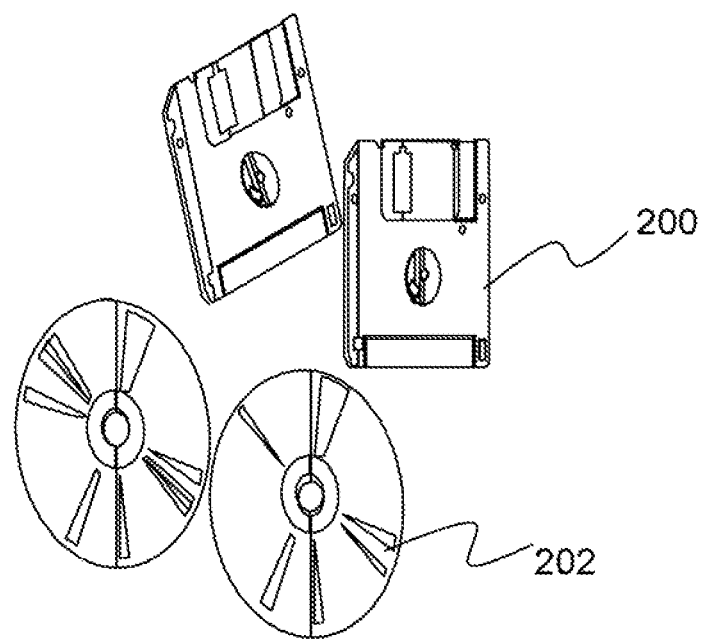
FIG. 2 is an illustration of a computer program product according to various embodiments of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" may be stored in the memory of a computer or on a computer-readable medium such as a floppy disk, a CD-ROM, and a flash drive. In either event, the instructions are encoded on a non-transitory computer-readable medium.

(2) Introduction

Figure 3A:
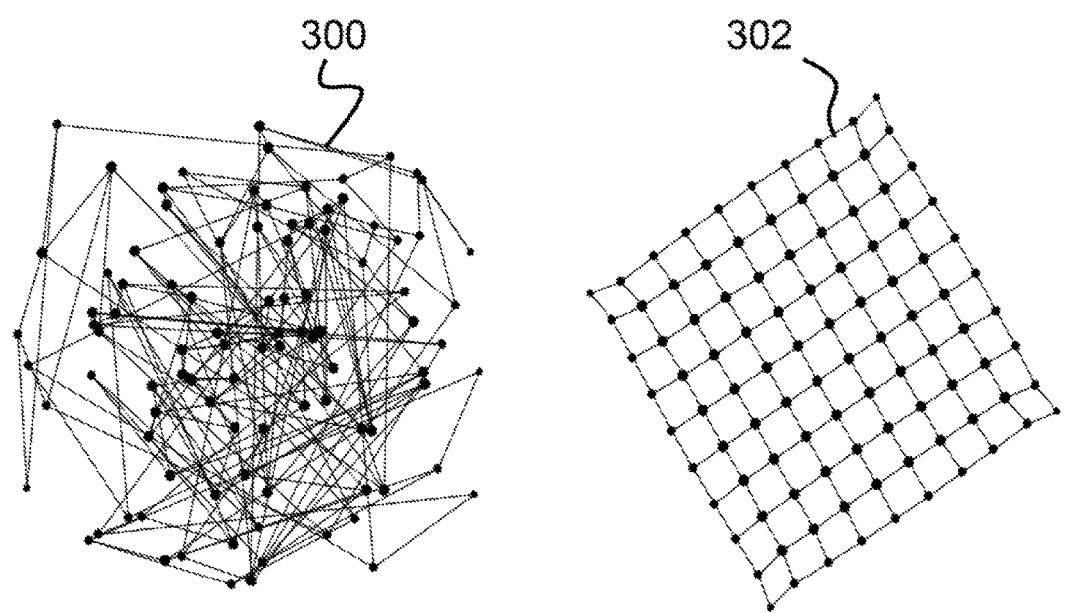
FIG. 3A is an illustration of two identical graphs, a first graph and second graph, where the second graph is generated from the first graph by using the system according to various embodiments of the present invention.

Graph visualization is an important tool in graph analysis. For example, the graphs in FIG. 3A are identical, but the structure of the first graph 300 is not apparent, even though the graph itself is very regular. After applying the graph visualization system according to the principles of the present invention, the structure of the graph becomes evident, as shown in the second graph 302. Specifically, and as illustrated in FIG. 3A, the second graph 302 is generated from the first graph 300 to assist in graph visualization. Thus, as can be appreciated, a need exists for an effective graph visualization tool.

Graph drawing algorithms of the prior art typically take into account several factors of the graph's embedding in space, such as angular resolution and crossing number, which are not inherent to the graph itself. The system described herein is unique in one aspect in that it does not rely on such metrics. Since the system does not rely on these metrics, it makes the process oblivious to the graph embedding, other than vertex position in space (either two-dimensional or higher-dimensional). Therefore, the system can be adapted for three-dimensional visualization with only trivial changes, as well as providing a visual alternative to existing graph drawing algorithms. This is inherently useful, since no single graph drawing algorithm performs well on every test case.

Graph visualization is a common problem, for instance in vehicular networks, computer networks, and relational data (such as disease transmission, social networks, and graphs of citations between authors). Given such a network, understanding it is partly accomplished through visualization techniques. The system according to the principles of the present invention provides a unique alternative to existing processes, with the added benefit that it does not need to be modified to work in three or higher dimensions. Specifically, the addition of betweenness centrality as a measure of vertex importance provides a more robust design that can present a general (sparse) graph in a meaningful way to a human observer. These aspects are described in further detail below.

(3) Specific Aspects of the Invention

Figure 3B:
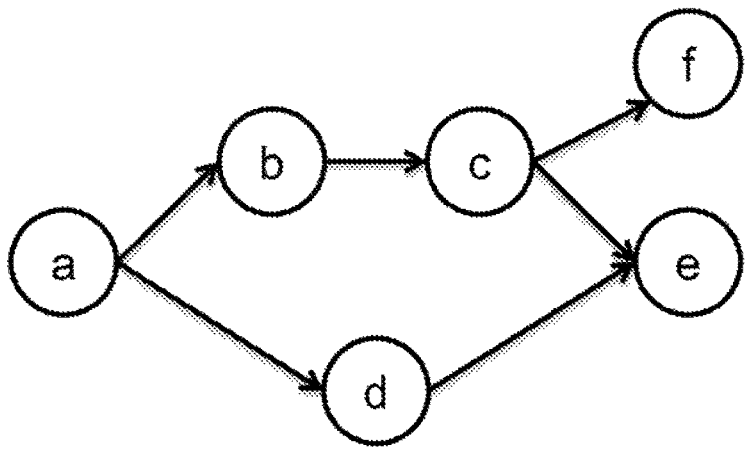
FIG. 3B is a graph illustrating an example of a graph with nodes and path distances.

Graph visualization is a difficult problem, in which a graph (or network) is the input to the algorithm, and the output is a "reasonable" realization of that graph in two dimensions. Path distance between vertices v and v' in a graph is the least number of edges that can be traversed to get from one node to another and is denoted by d(v,v'). A non-limiting example of such a graph is provided in FIG. 3B which illustrates a graph with nodes (vertices) and path distances. The nodes (vertices) represent any visualizable thing. As a non-limiting example, nodes represent users in an online social network and edges represent their relationships.

Betweenness centrality of a vertex v is a measure of the importance of v in the network, and is denoted by g(v). This system aims to position vertices v and v' at distance d(v, v')+g(v)+g(v') from each other, which will ensure that "important" vertices (defined more precisely below) are positioned far from other vertices, and that vertices near to each other in the graph are positioned relatively close together in the plane. This is accomplished by applying the standard gravitational force between two massive objects in space to each pair of vertices, where the mass of a vertex v is g(v). The distance between them is subtracted by d(v,v')+g(v)+g(v'), so that each pair of vertices naturally gravitates together when farther from this distance, and repel each other when closer than this distance. A unique aspect is the inclusion of betweenness centrality in the network as a component of the metric, and the use of gravitational force rather than spring-based forces in other graph visualization algorithms.

Figure 3C:
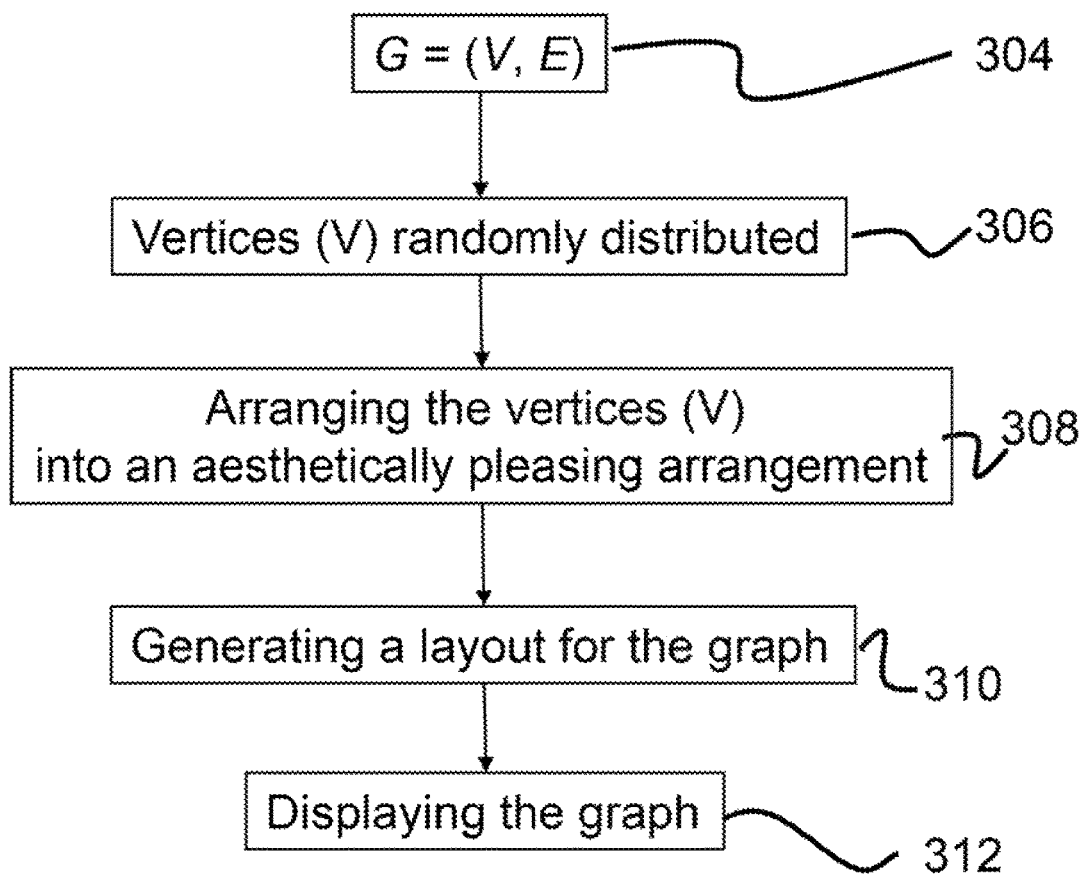
FIG. 3C is a flow chart illustrating the GBgraph process according to various embodiments of the present invention.

As shown in FIG. 3C, the gravity-betweenness graph drawing algorithm (GBgraph) takes as its input a graph G=(V,E) 304, where V is a set of vertices and E is the set of edges between them. The vertices are then randomly distributed 306 such that each dimension is randomly assigned a position between 0 and 1 to provide a starting point for the visualization. In pseudocode, for each v≠V do
      v.position:=(random(0,1), random(0, 1))
    end The second step of GBgraph is an iterative method that arranges the vertices 308 into an aesthetically pleasing arrangement, which can be depicted as a layout for the graph 310. Once the aesthetically pleasing graph layout is generated 310 using the process herein, it is displayed 312 to a user on a display device (e.g., monitor, screen, mobile platform, etc.) or other display apparatus. It should be noted that the term aesthetically pleasing graph layout generally refers to a graph layout that, when displayed, it more easily allows the observer to understand the structure of the graph better. As a non-limiting example, the graph layout includes a level of symmetry to cause the graph layout to appear directed as opposed to randomly organized or structure. It should be noted there is no "right answer", and different people may prefer different layouts; additionally different layouts may emphasize different aspects of the graph's structure.

Specifically, the system attempts to position two vertices v and v' at distance GB(v,v'):=d(v,v')+g(v)+g(v') from each other, where d(v,v') is the path distance between vertices v and v', and g(v) is the betweenness centrality of v. Formally, g(v) is defined by $$g(v) = \sum_{s \neq v \neq t} \frac{\delta_{st}(v)}{\delta_{st}},$$

where $\delta_{st}$ is the total number of shortest paths from s to t, and $\delta_{st}(v)$ is the total number of those shortest paths that pass through v. Therefore, g(v) is a measure of what fraction of all shortest paths in a graph pass through v, which is the precise meaning given to the "importance" of v in the network. The GBgraph algorithm iteratively attempts to place all pairs v and v' of vertices at distance GB(v,v') apart, with the underlying assumption that this arrangement will provide a good visualization.

Figure 4:
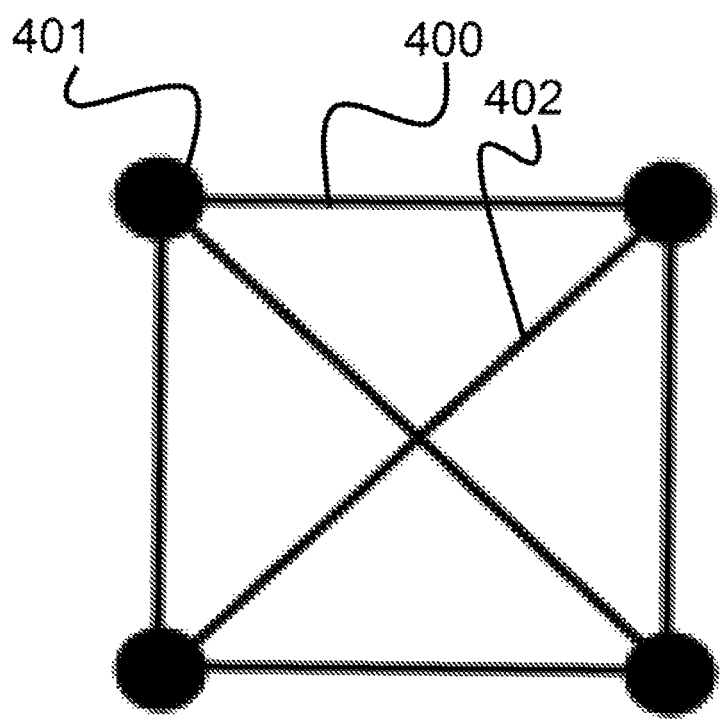
FIG. 4 is an illustration depicting a graph $K_4$, demonstrating that the six edges cannot all be made the same length l; the four outer edges will always form a parallelogram, and at most one of the diagonals can also be of length l.

Note that in general, such an arrangement is impossible. For instance, in the graph $K_4$, which has four vertices and all possible edges, GBgraph will attempt to position all four vertices equally far from each other. This is impossible, as shown in FIG. 4. Specifically, FIG. 4 provides a depiction of the graph $K_4$ with four vertices 401, demonstrating that the six edges cannot all be made the same length 1. In other words, the four outer edges 400 will always form a parallelogram, and at most one of the diagonals 402 can also be of length 1.

Because of the impossibility of achieving a consistent configuration of vertices, the iterative process will not converge, and hence the GBgraph algorithm will never terminate. To counter this, a parameter α is introduced that weakens the gravitational force over time. This process, known as damping or cooling, is frequently applied to simulated annealing algorithms, and has been employed in many graph-drawing algorithms. The cooling process slowly weakens the gravitational force over time, eventually tending to zero, so that the GBgraph algorithm will finish at the latest when the gravitational force is gone.

The mass of a vertex v is g(v); the distance between v and v' in the GBgraph algorithm is the Euclidean distance r between them, minus GB(v,v') (the intended distance). The gravitational force between two vertices, then, is $$F(v, v') = \lambda \frac{g(v)g(v')}{(r - GB(v, v'))^2}.$$

Rather than using the universal gravitational constant G, the system treats the gravitational constant λ as a parameter to the algorithm. This force will contribute to the force vectors acting on v and v'. Summing these force vectors over all pairs of vertices provides a resulting force vector for each vertex. Each vertex has a position and velocity; at each time step, the position is revised according to the particle's velocity, and the velocity is updated according to the net force. For example, in the pseudocode, each vertex stores its position and velocity (position is initially random in each dimension between 0 and 1; velocity is 0). At each time step of the algorithm the vertexes position and velocity are updated.

Note that a second alternative to the force function above is to replace it with a classical spring force according to Hooke's law. This will affect the final configuration, but will still incorporate the novel addition of betweenness centrality as a metric, and will still result in an algorithm entirely dependent upon graph characteristics, rather than on measurements of the particular embedding (except for distance).

Provided below is a non-limiting example of a pseudo-code outline for the GBgraph process. The force_between( ) function below is the function F above.

```
// initialize
for each v∈V do
    v.position:=(random(0,1),random(0,1))
    v.velocity:=(0.0)
end
energy=1// this is the cooling factor
// iterate until the system has cooled
while cooling_factor>εdo //ε is a lower energy threshold,
    such as 0.01 for each v∈v do
    force:=(0.0)
```

```
for each v'≠v∈V do
    pair_force_numerator:=λ×centrality(v)×centrality
        (v')
    pair_force_denominator:=(euclidean_distance
        (v,v')  -graph_distance(v,v')--centrality(v)-cen-
        trality(v'))²
    force=force+pair_force_numerator/pair_force_de-
        nominator
end
v.velocity:=(v.velocity+(timestep×force))×energy
v.position:=v.position+timestep×v.velocity
end
energy=energy×α//α is a parameter less than 1 (such as
    0.99)
end
```

Figure 5:
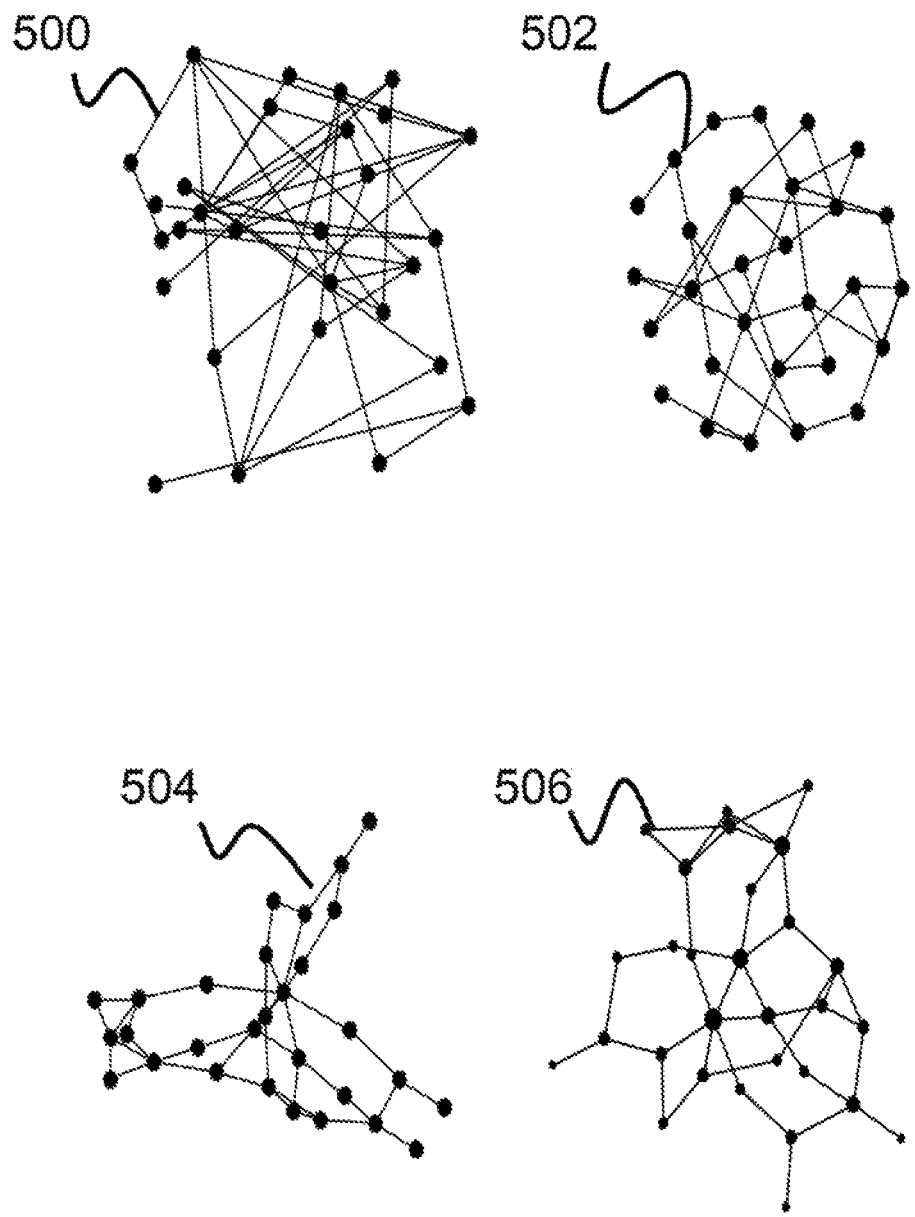
FIG. 5 depicts a series of randomly generated graphs, visualized as a random layout, as generated using the Fruchterman-Reingold algorithm, as generated using Hu's algorithm, and as generated using the GBgraph process according to various embodiments of the present invention.
Figure 6:
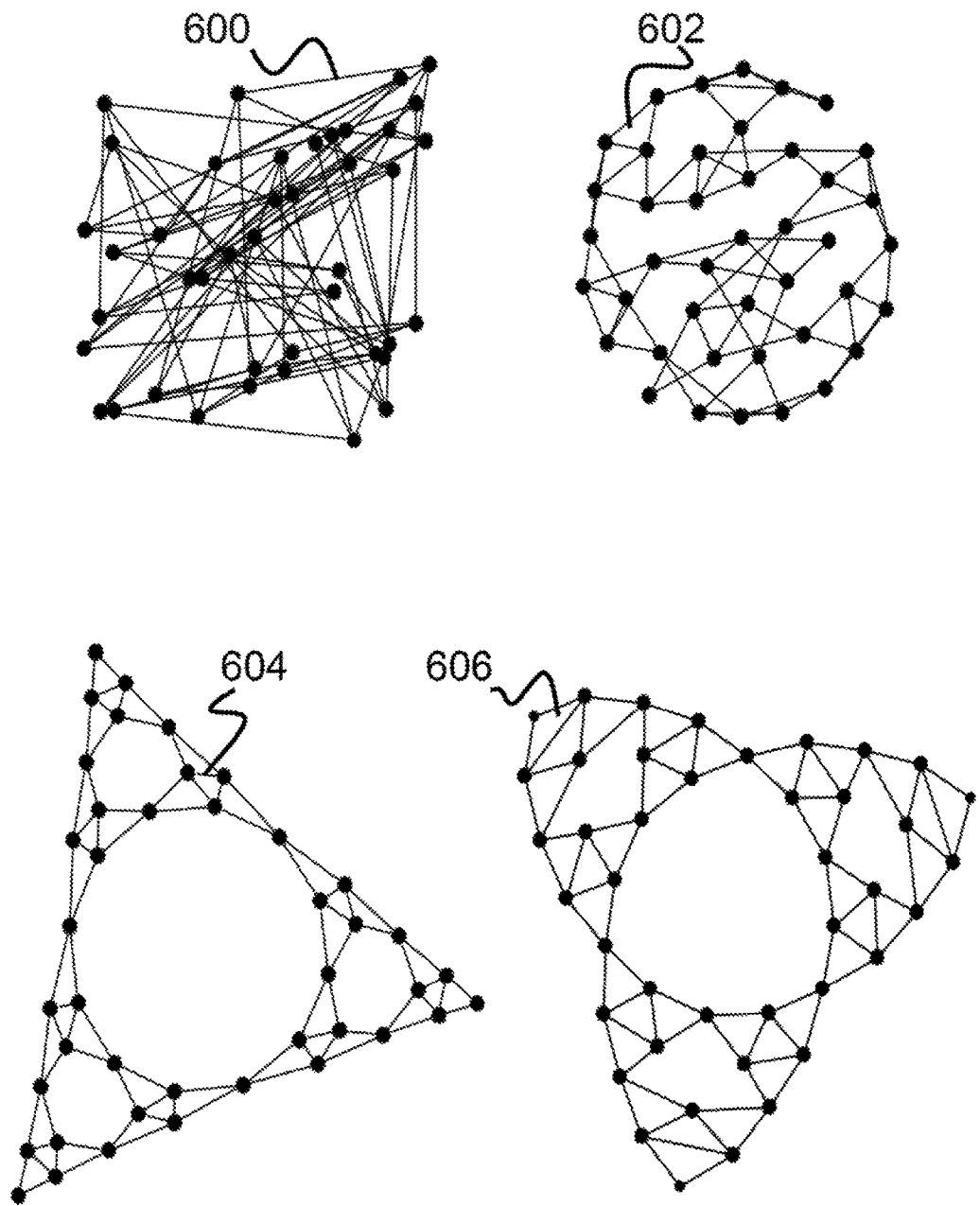
FIG. 6 depicts a series of Sierpinski graphs, visualized as a random layout, as generated using the Fruchterman-Reingold algorithm, as generated using Hu's algorithm, and as generated using the GBgraph process according to various embodiments of the present invention.

The GBgraph algorithm, implemented as above, performs well in comparison to other state of the art graph drawing algorithms. The last graphs in FIGS. 5 and 6 are the result of an implementation of the GBgraph process according to the principles of the present invention. The results of the Fruchterman-Reingold algorithm (see Fruchterman, T. M. J., & Reingold, E. M., "Graph Drawing by Force-Directed Placement." Software: Practice and Experience, 21(11), 1991) and Hu's algorithm (see Y. F. Hu, "Efficient and high quality force-directed graph drawing," The Mathemalica Journal, 10 (37-71), 2005) are given for comparison, which were implemented using the open-source software package Gephi (see Bastian M., Heymann S., Jacomy M., "Gephi: an open source software for exploring and manipulating networks," International AAAI Conference on Weblogs and Social Media, 2009).

Specifically, FIG. 5 illustrates a randomly-generated graph as a random layout 500, as generated with the with the Fruchterman-Reingold algorithm 502, as generated with Hu's algorithm 504, and as generated using the GBgraph process 506 according to the principles of the present invention.

Alternatively, FIG. 6 illustrates the fourth Sierpinski graph, visualized as a random layout 600, as generated by the Fruchterman-Reingold algorithm 602, as generated by Hu's algorithm 604, and as generated using the GBgraph process 606 according to the principles of the present invention. The fourth Sierpinski graph was described by Eric Weisstein. See Weisstein, Eric W. "Sierpiński Sieve Graph," From Math World—A Wolfram Web Resource, at http://mathworld.wolfram.com/SierpinskiSieveGraph.html, which is hereby incorporated by reference. FIG. 6 demonstrates the usefulness of strong graph visualization: even highly-structured and familiar graphs are unrecognizable in a disordered state. After the graph is generated, it is then visualized on a display device for user viewing and use.

The algorithmic complexity of the GBgraph process is dependent on the implementation of the all pairs shortest path calculation (which also yields the betweenness centrality of every vertex). The classical algorithm to accomplish this is the Floyd-Warshall algorithm, which is $O(|V|^2)$, dwarfing the $O(|V|^2)$ complexity of the inner loop of GBgraph and making the algorithm unsuitable for large graphs. However, improvements are possible using the more sophisticated algorithms of Johnson (see Johnson, Donald B., "Efficient algorithms for shortest paths in sparse networks", Journal of the ACM 24 (1): 1-13, 1977) which is $O(|V|^2 \log |V|+|V||E|)$, or (in the case of unweighted graphs) of Brandes (see Brandes, Ulrik, "A faster algorithm for betweenness centrality," Journal of Mathematical Sociology 25: 163-177, 2001), which is $O(|V||E|)$, both references of which are hereby incorporated by reference as though fully set forth herein. When $|E|$ is subquadratic (i.e. when the graph is sparse), this is a dramatic improvement. Since only sparse graphs can be reasonably visualized, these algorithms are desirable in implementation.

It is also possible to decrease the runtime of the inner loop of GBgraph using the Barnes-Hut method of n-body force calculation (originally published in J. Barnes and P. Hut, "A hierarchical O(N log N) force-calculation algorithm," Nature 324 (4): 446-449, 1986, which is hereby incorporated by reference as though fully set forth herein). The Barnes-Hut method is $O(|V| \log |V|)$, rather than $O(|V|^2)$ as stated above. Since the inner loop is iterated many times, this is worthwhile despite the fact that the initialization using Johnson's or Brandes' algorithm is more costly. Regardless of the optimization method used, it is clear that implementing the GBgraph process provides for a system of graph visualization that is a dramatic improvement over the prior art.

Thus, this disclosure provides the visualization ability of displaying a set of nodes and edges in a spatially aesthetic way. The drawing of the spatial positions of the nodes and edges are done by resolving a system of emulated physical forces, which are governed by path distance and betweenness centrality. The visualization technique addresses a wide range of general graph/network-based problems through exploratory analysis by a human observer. For instance, it addresses the general clustering (e.g., partition users into semantically related groups) problem of online users in social media research. In such a setting, nodes (vertices) represent users and edges represent their relationships (e.g., retweet, like). An example question which can be answered by the proposed visualization method is: are there any sub-communities (i.e., more densely connected graph) in the user network? Displaying the network randomly without any principled method is likely to give us the visualization as in the random layout 600 of FIG. 6, which does not provide any insight of the network topology. On the other hand, much more informative network visualization can be derived (as in layout 606 of FIG. 6) using the described method. Judging from the spatial arrangement of the nodes, which are divided into 3 major clusters, one can immediately answer the question (that users are more tightly connected in local sub-groups, and the connection are potentially driven by common interests or hobbies). The same techniques can be applied to different domains, such as protein-protein interaction networks (does proteins with similar functionalities interact more with each other?), collaboration networks (what are the most frequent collaborated research areas?), and many more.

Another application which is facilitated by the system lies on real-time analytics of graph data. With the capability of dynamically arranging and drawing the nodes and edges, human observers can find out about the structural and topological changes by adding or removing nodes and edges questions in real-time. This helps to answer questions such as: whether removing a node in a patient interaction network will slow down disease spread; or whether adding an edge in a road network will alleviate traffic congestion etc.

What is claimed is:

1. A system for graph visualization, the system comprising:
   one or more processors and a memory, the memory having, executable instructions encoded on a non-transitory computer readable medium, such that upon execution of the instructions, the one or more processors performs operations of:

receiving as an input a graph G=(V,E), where V is a set of vertices and E is a set of edges between the vertices;

distributing vertices through a unit square;

arranging the vertices to generate a graph layout, where arrangement of the vertices reflects a betweenness centrality; and displaying the graph layout on a display.

2. The system as set forth in claim 1, wherein arranging the vertices further comprises an operation of iteratively positioning two vertices v and v' at distance GB(v, v'):=d (v,v')+g(v)+g(V') from each other, where d(v,v') is a path distance between vertices v and v', and g(v) is the betweenness centrality of v.

3. The system as set forth in claim 2, wherein in distributing vertices through a unit square, the vertices are randomly distributed.

4. The system as set forth in claim 3, wherein each vertice represents a user on a social network and each edge represents a relationship between the users.

5. The system as set forth in claim 1, wherein in distributing vertices through a unit square, the vertices are randomly distributed.

6. The system as set forth in claim 1, wherein arranging the vertices, the vertices are arranged using betweenness centrality in a force directed graph based on gravitational forces.

7. The system as set forth in claim 6, wherein arranging the vertices further comprises an operation of iteratively positioning two vertices v and t? at distance GB(v,v'):=d(v, v')+g(v)+g(v') from each other, where a mass of a vertex v is g(v) and a distance between v and v' is a Euclidean distance r between them, minus GB(v,v') such that gravitational force between the two vertices is defined as $$F(v, v') = \lambda \frac{g(v)g(v')}{(r - GB(v, v'))^2}.$$

where λ is a gravitational constant.

8. The system as set forth in claim 1, wherein each vertice represents a user on a social network and each edge represents a relationship between the users.

9. A method for graph visualization, the method comprising an act of:

causing one or more processors to execute instructions encoded on a non-transitory computer-readable medium, such that upon execution, the one or more processors perform operations of:

receiving as an input a graph G(V,E) where V is a set of vertices and E is a set of edges between the vertices;

distributing vertices through a unit square;

arranging the vertices to generate a graph layout, where arrangement of the vertices reflects a betweenness centrality; and displaying the graph layout on a display.

10. The method as set forth in claim 9, wherein arranging the vertices further comprises an operation of iteratively positioning two vertices v and v' at distance GB(v, v'):=d (v,v')+g(v)+g(v') from each other, where d(v,v') is a path distance between vertices v and v', and g(v) is the betweenness centrality of v.

11. The method as set forth in claim 10, wherein in distributing vertices through a unit square, the vertices are randomly distributed.

12. The method as set forth in claim 11, wherein each vertice represents a user on a social network and each edge represents a relationship between the users.

13. The method as set forth in claim 9, wherein in distributing vertices through a unit square, the vertices are randomly distributed.

14. The method as set forth in claim 9, wherein arranging the vertices, the vertices are arranged using betweenness centrality in a force directed graph based on gravitational forces.

15. The method as set forth in claim 14, wherein arranging the vertices further comprises art operation of iteratively positioning two vertices v and v' and at distance GB(v,v'):=d(v, v')+g(v)+g(v') from each other, where a mass of a vertex v is g(v) and a distance between v and v' is a Euclidean distance r between them, minus GB(v,v'), such that gravitational force between the two vertices is defined as:

$$F(v, v') = \lambda \frac{g(v)g(v')}{(r - GB(v, v'))^2}.$$

where λ is a gravitational constant.

16. The method as set forth in claim 9, wherein each vertice represents a user on a social network and each edge represents a relationship between the users.

17. A computer program product for graph visualization, the computer program product comprising:

a non-transitory computer-readable medium having executable instructions encoded thereon, such that upon execution of the instructions by one or more processors, the one or more processors perform operations of:

receiving as an input a graph G=(V,E), where V is a set of vertices and E is a set of edges between the vertices;

distributing vertices through a unit square;

arranging the vertices to generate a graph, layout, where arrangement of the vertices reflects a betweenness centrality; and displaying the graph layout on a display.

18. The computer program product as set forth in claim 17, wherein arranging the vertices further comprises an operation of iteratively positioning two vertices v and v' at distance GB(v,v'):=d(v,v')+g(v)+g(v') from each other, where d (v,v') is a path distance between vertices v and v', and g(v) is the betweenness centrality of v.

19. The computer program product as set forth in claim 18, wherein in distributing vertices through a unit square, the vertices are randomly distributed.

20. The computer program product as set forth in claim 19, wherein each vertice represents a user on a social network and each edge represents a relationship between the users.

21. The computer program product as set forth in claim 17, wherein in distributing vertices through a unit square, the vertices are randomly distributed.

22. The computer program product as set forth in claim 17, wherein arranging the vertices, the vertices are arranged using betweenness centrality in a force directed graph based on gravitational forces.

23. The computer program product as set forth in claim 22, wherein arranging the vertices further comprises an operation of iteratively positioning two vertices v and v' at distance GB(v,v'):=d(v,v')+g(v)+g(v') from each other, where a mass of a vertex v is g(v) and a distance between v and v' is a Euclidean distance r between them, minus GB(v,v'), such that gravitational force between the two vertices is defined as:

$$F(v, v') = \lambda \frac{g(v)g(v')}{(r - GB(v, v'))^2}.$$

where $\lambda$ is a gravitational constant.

24. The computer program product as set forth in claim 17, wherein each vertice represents a user on a social network and each edge represents a relationship between the users.

* * * * *